(12) United States Patent
Robert

(10) Patent No.: US 7,765,225 B2
(45) Date of Patent: Jul. 27, 2010

(54) SEARCH SYSTEM

(75) Inventor: Luk Wing Pong Robert, Hong Kong (HK)

(73) Assignee: The Hong Kong Polytechnic University, Kowloon, Hong Kong (CN)

( * ) Notice: Subject to any disclaimer, the term of this patent is extended or adjusted under 35 U.S.C. 154(b) by 494 days.

(21) Appl. No.: 10/910,055

(22) Filed: Aug. 3, 2004

(65) Prior Publication Data

US 2006/0031215 A1 Feb. 9, 2006

(51) Int. Cl.
G06F 7/00 (2006.01)
G06F 17/30 (2006.01)

(52) U.S. Cl. .................. 707/765; 707/771; 715/759

(58) Field of Classification Search .............. 707/3, 707/4
See application file for complete search history.

(56) References Cited

U.S. PATENT DOCUMENTS

| | | | |
|---|---|---|---|
| 4,509,139 A | 4/1985 | Creager, Sr. | |
| 4,931,935 A | 6/1990 | Ohira et al. | |
| 5,148,522 A | 9/1992 | Okazaki | |
| 5,175,814 A | 12/1992 | Anick et al. | |
| 5,197,005 A | 3/1993 | Shwartz et al. | |
| 5,347,623 A | 9/1994 | Takano et al. | |
| 5,454,106 A | 9/1995 | Burns et al. | |
| 5,493,677 A | 2/1996 | Balogh et al. | |
| 5,586,240 A | 12/1996 | Khan et al. | |
| 5,586,288 A | 12/1996 | Dahlberg | |
| 5,600,833 A | 2/1997 | Senn et al. | |
| 5,668,966 A | 9/1997 | Ono et al. | |
| 5,717,914 A * | 2/1998 | Husick et al. | 707/5 |
| 5,745,882 A | 4/1998 | Bixier et al. | |
| 5,768,578 A | 6/1998 | Kirk et al. | |
| 5,822,731 A * | 10/1998 | Schultz | 704/270.1 |
| 5,842,203 A | 11/1998 | D'Elena et al. | |
| 5,867,688 A | 2/1999 | Simmon et al. | |
| 5,911,138 A | 6/1999 | Li et al. | |
| 5,938,779 A | 8/1999 | Preston | |
| 5,946,678 A | 8/1999 | Aalbersberg | |
| 5,982,370 A | 11/1999 | Kamper | |
| 6,014,662 A | 1/2000 | Moran et al. | |
| 6,026,388 A | 2/2000 | Liddy et al. | |
| 6,085,205 A | 7/2000 | Peairs et al. | |
| 6,094,648 A | 7/2000 | Aalbersberg | |
| 6,128,717 A | 10/2000 | Harrison et al. | |
| 6,198,939 B1 | 3/2001 | Holmstrom et al. | |
| 6,297,824 B1 | 10/2001 | Hearts et al. | |
| 6,313,833 B1 | 11/2001 | Knight | |
| 6,317,739 B1 | 11/2001 | Hirata et al. | |

(Continued)

*Primary Examiner*—Cam Y T Truong
(74) *Attorney, Agent, or Firm*—Marshall, Gerstein & Borun LLP

(57) ABSTRACT

A method of searching a plurality of semi-structured and/or unstructured documents comprising the steps of: providing a search interface having a search term input window, a search initiation button and a plurality search result display window, the search interface further including one or more search term clarification buttons; providing a plurality of documents having one or more search identifier terms associated therewith; inputting a search term into the search term input window and initiating a search; searching for documents related the search term, and displaying documents identified by the search in the search result display windows, wherein each search result display window displays search results related to a particular identifier term, and wherein further the search identifier term assigned to each search result display window is dependent upon the results of prior searches.

15 Claims, 4 Drawing Sheets

U.S. PATENT DOCUMENTS

| | | |
|---|---|---|
| 6,338,059 B1 | 1/2002 | Fields et al. |
| 6,345,273 B1 | 2/2002 | Cochran |
| 6,356,286 B1 | 3/2002 | Lawrence |
| 6,389,477 B1 | 5/2002 | Simmon et al. |
| 6,404,446 B1 | 6/2002 | Bates et al. |
| 6,418,429 B1 | 7/2002 | Borovoy et al. |
| 6,446,054 B1 | 9/2002 | Lopez |
| 6,463,428 B1 | 10/2002 | Lee et al. |
| 6,484,164 B1 | 11/2002 | Nikolovska et al. |
| 6,484,190 B1 | 11/2002 | Cordes et al. |
| 6,499,029 B1 | 12/2002 | Kurapati et al. |
| 6,505,194 B1 | 1/2003 | Nikolovska et al. |
| 6,574,620 B2 | 6/2003 | Borovoy et al. |
| 6,615,207 B1 | 9/2003 | Lawrence |
| 6,662,177 B1 | 12/2003 | Martino et al. |
| 6,665,687 B1 | 12/2003 | Burke |
| 6,826,559 B1 * | 11/2004 | Ponte ............... 707/3 |
| 7,395,259 B2 * | 7/2008 | Bailey et al. ............. 707/3 |
| 2001/0051942 A1 | 12/2001 | Toth |
| 2002/0059297 A1 | 5/2002 | Schirmer et al. |
| 2002/0073078 A1 | 6/2002 | Ku et al. |
| 2002/0075322 A1 | 6/2002 | Rosenzweig et al. |
| 2002/0080157 A1 | 6/2002 | Chickles et al. |
| 2002/0105550 A1 | 8/2002 | Biebesheimer et al. |
| 2002/0109709 A1 | 8/2002 | Sagar et al. |
| 2002/0143749 A1 | 10/2002 | Hartel et al. |
| 2002/0143757 A1 | 10/2002 | Borovoy et al. |
| 2002/0149614 A1 | 10/2002 | Biebesheeimer et al. |
| 2002/0169754 A1 * | 11/2002 | Mao et al. ............... 707/3 |
| 2002/0184384 A1 | 12/2002 | Simmon et al. |
| 2003/0016250 A1 | 1/2003 | Chang et al. |
| 2003/0018666 A1 | 1/2003 | Chen et al. |
| 2003/0036927 A1 | 2/2003 | Bowen |
| 2003/0037050 A1 * | 2/2003 | Monteverde ............ 707/6 |
| 2003/0048785 A1 | 3/2003 | Calvignac et al. |
| 2003/0070030 A1 | 4/2003 | Smith et al. |
| 2003/0093409 A1 | 5/2003 | Weil et al. |
| 2003/0120779 A1 | 6/2003 | Rodefer et al. |
| 2003/0126120 A1 | 7/2003 | Faybishenko |
| 2003/0135725 A1 | 7/2003 | Schirmer et al. |
| 2003/0154162 A1 | 8/2003 | Danaher et al. |
| 2003/0191755 A1 | 10/2003 | Borovoy et al. |
| 2003/0202002 A1 | 10/2003 | Kethireddy |
| 2005/0050024 A1 * | 3/2005 | Ellis et al. ............... 707/3 |

* cited by examiner

SEARCH SYSTEM

BACKGROUND OF THE INVENTION

The present invention relates to a system for searching information stored electronically. In particular, though not exclusively, the present invention relates to a system for searching information found on the world wide web.

A number of Internet search engines are presently available which allow a user to retrieve information, such as web pages, images, news group postings and the like, based upon one or more user specified keywords. Perhaps the most widely known of these search engines is the Google search engine. The Google search engine includes a fixed designation interface wherein an inputted search term results in the production of a list of documents or "hits" which contain the search term. The Google ranking system typically orders the hits depending upon the number of times the search term occurs in a given document. It will be appreciated however that such a system leads to documents in different categories being listed next to one another. The Google search engine does permit a degree of tailoring of the search hits by using predefined fixed search criteria. These criteria can be selected either before or after a search term has been inputted. The predefined search criteria provided by the Google search engine include "Web", "Images", "Groups" and "Sews", however these fixed criteria are often not sufficient to enable a user to tailor a search in a meaningful manner.

BRIEF SUMMARY OF THE INVENTION

According to the present invention there is provided a method of searching a plurality of semi-structured or unstructured documents comprising the steps of:

providing a search interface having a search term input window, a search initiation button and a plurality search result display window, the search interface further including one or more search term clarification buttons;

providing a plurality of documents having one or more search identifier terms associated therewith inputting a search term into the search term input window and initiating a search;

searching for documents related to the search term, and displaying documents identified by the search in the search result display windows, wherein each search result display window displays search results related to a particular identifier term, and wherein further the search identifier term assigned to each search result display window is dependent upon the results of prior searches.

It will be understood that the terms "semi-structured" and "unstructured" relate to documents such as web pages and news articles which are not comprised of data only from known data types that are specified in a plurality of predefined fields (such as those data from relational databases).

The search term clarification buttons may be utilised to assign specific additional search terms to a search term inputted by a user into the search window. The additional search terms assigned to the search clarification buttons may correspond to search identifier terms associated with documents which may be searched. Preferably the search terms assigned to the search clarification buttons correspond to the most popular search terms utilised in prior searches. A user may utilise one or more of the search term clarification buttons either before or after inputting a search term into the search window.

The identifier terms assigned to a searchable document may comprise words or phrases found in the body of the document. Alternatively the identifier terms may comprise words or phrases attached to but not visible in the document.

According to a further aspect of the present invention there is provided a search interface having a search term input window, a search initiation button and a search result display window, the search interface further including one or more search term clarification buttons, wherein the operation of the or each search term clarification button is dependent upon prior searches undertaken by the search interface. The operation of the or each search term clarification button may be dependent upon the occurrence of search terms used in prior searches. Alternatively the operation of the or each search term clarification button may be dependent upon the occurrence of terms appearing in the results of prior searches. Alternatively the operation of the or each search term clarification button may be dependent upon the occurrence of identifier terms assigned to the results of prior searches.

The search interface may be provided with a plurality of search result display windows which, in use, display the results of a search.

BRIEF DESCRIPTION OF THE DRAWINGS

An embodiment of the present invention will now be described with reference to the accompanying drawings in which.

DETAILED DESCRIPTION

Figure 1:
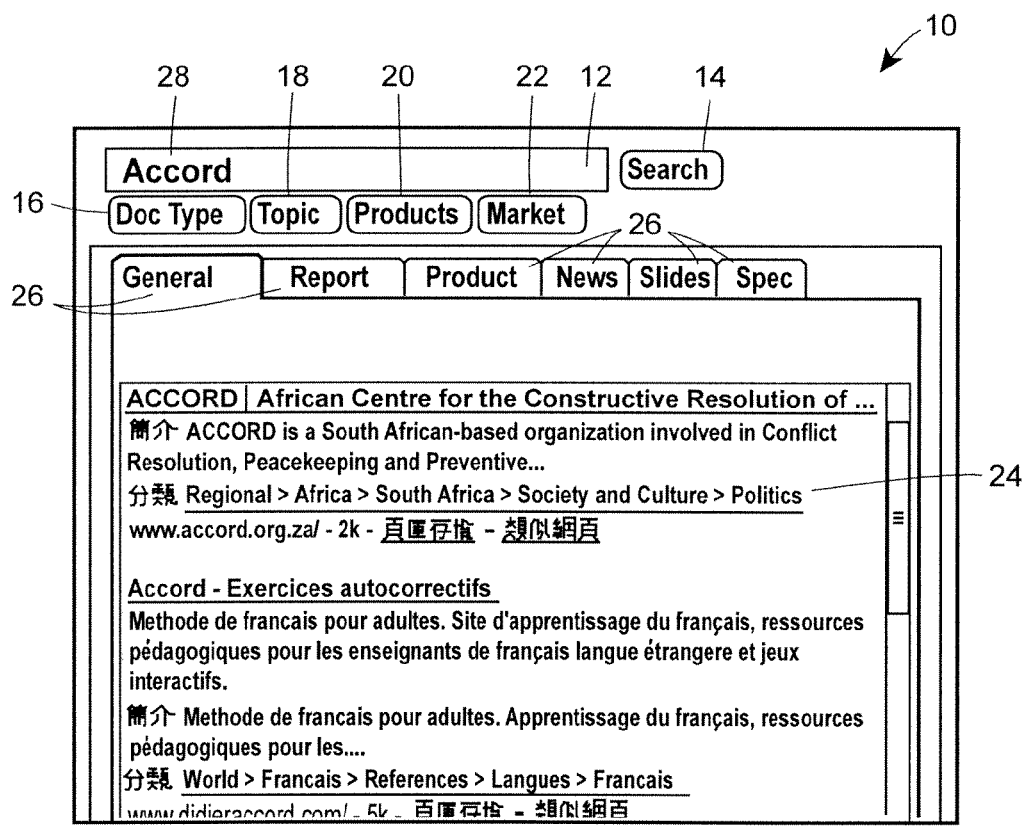
FIG. 1 shows an interface for a search system according to the present invention.

Referring firstly to FIG. 1 there is shown an interface, generally designated 10, for an Internet based search system. The interface 10 is presented to a user on a display means such as a screen, and the user may interact with the interface 10 by known interface means such as a keyboard and mouse. The interface 10 includes a search window 12 into which a user may type one or more search terms and a search button 14 which a user may "press" to initiate a search based on one or more terms typed into the window 12. The interface 10 further includes four topic buttons 16, 18, 20, 22 which are marked "Doc Type", "Topic", "Products" and "Market" respectively. The topic buttons 16, 18, 20, 22 may be employed to refine the results of a search and will be described in greater detail below.

The interface also includes a number of result display windows 24 of which only the uppermost is shown in FIG. 1. Each window 24 is provided with a tab 26 bearing the name of a class which relates to the results displayed in that particular window. In the embodiment shown there are provided six windows 24 having the class names "General", "Report", "Product", "News", "Slides" and "Spec". The windows 24 are configured such that when a particular tab 24 is selected, for example by clicking on the tab 26 with a cursor, the window 24 is presented uppermost.

FIG. 1 shows the situation where a user inputs a single search term into the search window 12, for example the term "Accord" 28 and presses the search button 14. The search has identified a number of hits which are perceived to be relevant and are presented in lists on the result display windows 24.

The results presented in each display window 24 are related to the class described on the tab 26 of the respective window 24. The various classes, and hence the order in which the search result display windows 24 are presented, are ranked based on an aggregated similarity score. In the embodiment shown documents falling to "General" class are perceived to be of more relevance to the user than documents falling into the "Product" class.

The order in which the classes, and hence the display windows 24, is presented is changeable dependent upon the prior actions of users of the search system. For example, should users searching the term "Accord" exhibit a tendency to immediately go to a display window 24 having a particular class heading, for example "Product" then order of the classes can be changed such that subsequent users are presented with the "Product" class display window 24 uppermost. Additionally where users subsequently choose to view "Accord" documents associated with a class which is not presently included in the class headings, such as "Vehicle", then this class may be included in subsequent searches if it is deemed more popular than an existing class heading.

Figure 2:
FIG. 2 shows another view of an interface for a search system according to the present invention.

As described above, the interface 10 is provided with four topic buttons 16, 18, 20, 22 which are marked "Doc Type", "Topic", "Products" and "Market" respectively. These topic buttons may be employed either before or after a search term has been inputted into the search window 12 to narrow the results of the search. FIG. 2 shows the result where a search term "Accord" has been inputted as described with reference to FIG. 1 and thereafter the topic button marked "Topic" has been pressed. As before, the user is provided with a plurality of search result display windows 24 however the classes displayed on the tabs 26 are different. In the embodiment shown in FIG. 2 the class headings are, in order of perceived relevance to the user, "Organization", "Entertainment", "Gov", "Edu", "Slides" and "Spec". As before, the order in which the class headings are presented may be changed depending upon the documents which are subsequently viewed by users of the system.

In a similar manner to the class headings the nature and order of the topic buttons may also be varied as a result of the habits of users of the system. For example, should there be a flurry of travel related searches where the term "Travel" is utilised as a search term, then a topic button marked "Travel" may be provided for subsequent searchers to utilise. In the embodiment shown the interface 10 is provided with four topic buttons 16,18,20,22, however it will be appreciated that additional topic buttons may be provided.

Figure 3:
FIG. 3 shows a further view of an interface for a search system according to the present invention.

FIG. 3 illustrates the situation where a search term is used which is considered to be so vague or broad in subject matter that the results generated thereby are deemed to fall into a multitude of classes. In such an instance the results are divided into a number of super classes 30 which in turn have a plurality of sub classes. Each super class and its associated subclasses are arranged in a result display window 24 as described above. The super class and subclasses are presented in the form of a two dimensional array. In the embodiment shown in FIG. 3 the use of a broad search term has generated four super classes 30 headed "Language", "Topics", "Media" and "Doc Type" with each having a range of related subclasses. For example the "Language" super class has subclasses headed "Japanese", "Chinese", "French", "Indian" and "German", while the "Media" super class has subclasses headed "Image", "Audio", "Video", "Animation" and "Drawing".

The super classes are presented to the user in order of perceived importance as estimated by the system based on the aggregate document similarity scores within the super or sub classes, as well as combining these scores with scores based on the actions and preferences of previous users of the system. As before the subclasses are ranked in order of this perceived importance estimate and the order of the super classes and associated subclasses may be changed based upon previous user actions.

Figure 4A:
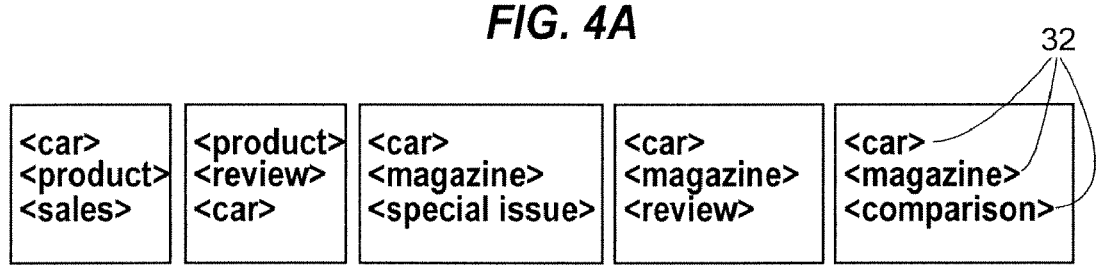
FIGS. 4a to 4c illustrate a document categorisation system of the present invention.
Figure 4B:
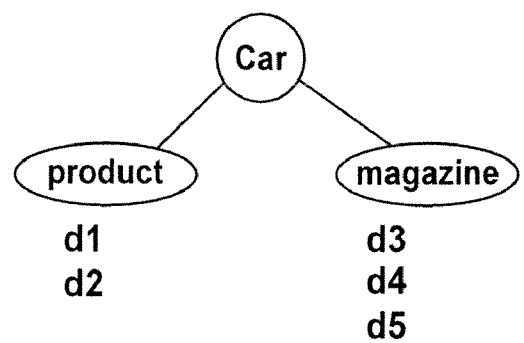
Figure 4C:
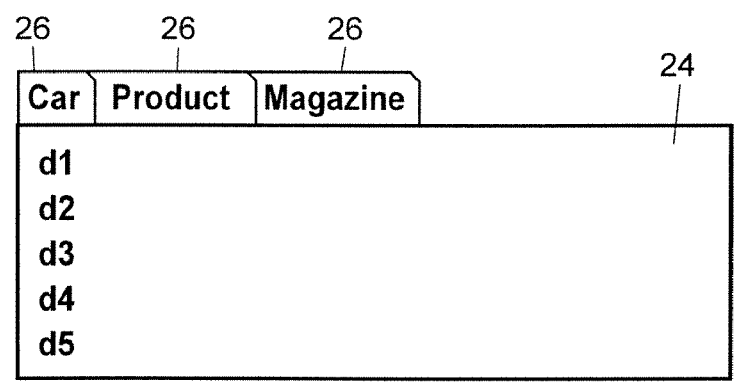

FIGS. 4a to 4b show a simplified example of how the system of the present invention analyses and subsequently presents documents identified by a particular search term. Looking firstly at FIG. 4a a search for the term "Honda" may result in the identification of five documents identified as d1 to d5. Each document contains a number of identifier terms or labels 32 which may either be contained within the text of the document or attached thereto For the sake of simplicity each document is shown to have three identifier terms 32. For example, document d1 has the identifier terms "car", "product" and "sales", while document d4 has the identifier terms "car", "magazine" and "review". The identifier terms 32 may be either contained in the text of the document or attached to the document, for example in the form of a metatag, in a manner which is not visible to a reader of the document. It will be appreciated that a document may include a combination of each type of term 32. In the instance of a non-visible term, this may be assigned to a particular document by a reviewer of the document or assigned automatically by an automated means such as, for example, a text classifier.

Having identified documents d1 to d5 as being particularly relevant to the requested search, the system then orders them for presentation to the user. The ordering of the results is based on an analysis of the identifier terms attached to or contained within the documents. In the present example the term "car" is present in all five documents, the term "magazine" in three documents (d3, d4 and d5), the term "product" in two documents (d1, d2) and the term "review" in two documents (d2, d4) and the terms "sales", "special issue" and "comparison" in one document each. As the term "car" appears most often then documents having this term are perceived to be of the most relevance. These documents are thus presented in a result display window 24 with the term "car" appearing on a tab 26 to denote the class of the documents displayed. Documents having the term "product" are perceived to be the second most relevant class of documents and documents having the term "magazine" the third.

The relevance of the various terms and the documents associated therewith may be judged on a combination of the number of times a given term occurs and the ranking of the term within a given document. In the present example it will be appreciated that the term "magazine" occurs three times and the term "product" two times, however the relevance of the "product" documents is perceived to be greater than that of the "magazine" documents. It will be noted that "product" is the top term in one document and the second term in the other document, while the term "magazine" is consistently the second term.

As has been described above, a user may refine their search, either before or after inputting a keyword, by using the topic buttons 16,18,20,22 on the interface 10. A user may also input a topic or class term into the search window 12 along with a search term. For example, a user wishing to identify documents relating to travel and Hawaii may input "\travel Hawaii" into the search window before pressing the search button. This would instruct the system to identify all documents having the identifier label "travel" associated therewith before then searching these documents for references to Hawaii. Additionally the system may be configured such that inputting "\travel" instructs the system to identify documents having identifier labels which are deemed to be related to travel such as, for example, "hotel", "flights" and "car hire"

The invention claimed is:

1. A method of searching a plurality of documents comprising the steps of:
   providing a search interface having a search term input window for receiving user entered search terms, a search initiation button, one or more search term clarification buttons which, when selected, assign one or more specific additional search terms to one or more user entered input search terms, and a plurality of search result display windows;
   receiving the one or more user entered input search terms into the search term input window and initiating a search;
   searching a plurality of structured or unstructured documents for documents related to the one or more user entered input search terms;
   classifying search results into a plurality of search results classes based on search identifier terms associated with the semi-structured or unstructured documents included in search results;
   determining a perceived relevance for the plurality of search results classes based at least in part on a popularity of the search identifier terms associated with the search results classes as determined from prior searches including at least one of the one or more user entered input search terms, and wherein the determining further based at least in part by an aggregate document similarity score for the structured or unstructured documents identified by the search of semi-structured or unstructured documents calculated based on a number of times a search identifier term associated with a class is included in the related documents, so that the perceived relevance is determined at least in part by actions of prior users;
   displaying the search results in the plurality of search result display windows such that different search result display windows display search results related to different search result classes, and wherein the plurality of search results display windows are displayed in a changeable order determined by the perceived relevance of the search results classes, and
   refining the search results upon receiving a selection of one or more of the search term clarification buttons either before or after receiving a user entered search term in the search window.

2. The method as claimed in claim 1 wherein the search interface further includes one or more search term clarification buttons which, when selected by a user, assign specific additional search terms to a search term entered by a user into the search term input window.

3. The method as claimed in claim 2 including the step of using one or more of the search term clarification buttons either before or after inputting a search term into the search window.

4. The method as claimed in claim 2 wherein the additional search terms assigned to the search clarification buttons correspond to search identifier terms associated with searchable documents.

5. The method as claimed in claim 4 wherein the additional search terms assigned to the search clarification buttons correspond to the most popular search terms utilized in prior searches.

6. The method as claimed in claim 1 wherein the identifier terms associated with the semi-structured or unstructured documents comprise words or phrases found in the body of the semi-structured or unstructured documents.

7. The method as claimed in claim 1 wherein the identifier terms associated with the semi-structured or unstructured documents comprise words or phrases attached to the semi-structured or unstructured documents but not visible in the body of the semi-structured or unstructured documents.

8. The method as claimed in claim 1 further including the step of inputting a topic or class term into the search window together with a search term to identify documents including the search term and having document identifier labels related to the topic or class.

9. The method as claimed in claim 8 including the step of appending a symbol to the topic or class term to identify the topic of class term as a document identifier label search term.

10. A method of searching documents containing one or more search terms entered in a search window and displaying search results of the search, the method comprising:
    searching a plurality of documents by using a computer to define a plurality of search results classes based on characteristics of the documents in search results, wherein the searching is based on the one or more search terms entered by a user;
    determining a perceived relevance for the search results classes based on a number of times search identifier terms associated with the search results classes appear in documents that are returned from prior searches included the one or more search terms, and wherein the determining further based on an aggregate document similarity score for the documents identified by the search, such that the perceived relevance of the search results classes is determined at least in part by actions of prior users performing searches including the same one or more search terms, and at least in part by the number of times the search identifier terms appear in the documents identified by the search;
    displaying a plurality of selectable search results classification tabs on a display device, the search results classification tabs corresponding to search results classes, and the plurality of search results classification tabs displayed in a changeable order determined by the perceived relevance of the corresponding results classes such that a first search results classification tab corresponding to a search results class having a higher perceived relevance is displayed ahead of a second search classification tab corresponding to a search results class having a lower perceived relevance;
    displaying search results associated with a search results class in a search result display window on the display device when a search results classification tab of the search results classification tabs corresponding to a search results class of the search results classes has been selected; and
    refining the search results upon selection of a search term clarification button either before or after one or more search terms are entered into the search window.

11. The method of claim 10 further comprising defining and displaying a plurality of selectable topics for narrowing search results such that only search results relating to a selected topic are displayed.

12. The method of claim 11 wherein the topics are displayed in a changeable order determined at least in part by document viewing selections made by users in previous searches.

13. The method of claim 11 wherein the results classification tabs displayed on the display device are based on the search results narrowed by the selected topic.

14. The method of claim 10 further comprising defining a plurality of search results sub-classes associated with the plurality of search results classes, determining a perceived relevance for the search results sub-classes, displaying a plurality of selectable search results sub-classification tabs on the display device, the search results sub-classification tabs corresponding to the search results sub-classes, and displayed in a changeable order determined by the perceived relevance of the corresponding search results sub-classes.

15. The method of claim 10 wherein selected search results class is selected either by a user or by default based on the largest perceived relevance of corresponding results classes.

* * * * *